US006796921B1

(12) United States Patent
Buck et al.

(10) Patent No.: US 6,796,921 B1
(45) Date of Patent: Sep. 28, 2004

(54) THREE SPEED ROTARY POWER TOOL (75) Inventors: William Buck, Clemson, SC (US); John E. Nemazi, Bloomfield, MI (US)

(73) Assignee: One World Technologies Limited, Hamilton (BE)

( * ) Notice: Subject to any disclaimer, the term of this patent is extended or adjusted under 35 U.S.C. 154(b) by 0 days.

(21) Appl. No.: 10/449,226

(22) Filed: May 30, 2003

(51) Int. Cl.$^7$ .................................................. F16H 3/44
(52) U.S. Cl. ......................................... 475/299; 173/47
(58) Field of Search ........................... 475/299; 173/47, 173/216, 217

(56) References Cited

U.S. PATENT DOCUMENTS

| | | |
|---|---|---|
| 1,693,139 A | 11/1928 | Dietsche |
| 2,848,908 A | 8/1958 | Hollis |
| 2,941,420 A | 6/1960 | Graybill |
| 3,774,476 A | 11/1973 | Söhnlein et al. |
| 3,834,467 A | 9/1974 | Fuchs |
| 3,872,742 A | 3/1975 | States |
| 3,901,104 A | 8/1975 | Sims |
| 4,178,813 A | 12/1979 | Smemo |
| 4,199,286 A | 4/1980 | Kirkham |
| 4,215,594 A | 8/1980 | Workman, Jr. et al. |
| 4,366,871 A | 1/1983 | Dieterle et al. |
| 4,418,766 A | 12/1983 | Grossman |
| 4,453,430 A | 6/1984 | Sell |
| 4,493,223 A | 1/1985 | Kishi et al. |
| 4,536,688 A | 8/1985 | Roger |
| 4,651,580 A | 3/1987 | Deane |
| 4,791,833 A | 12/1988 | Sakai et al. |
| 4,823,885 A | 4/1989 | Okumura |
| 4,828,049 A | 5/1989 | Preis |
| 4,834,192 A | 5/1989 | Hansson |
| 4,869,131 A | 9/1989 | Ohmori |
| 4,892,013 A | 1/1990 | Satoh |
| 4,898,249 A | 2/1990 | Ohmori |

(List continued on next page.)

FOREIGN PATENT DOCUMENTS

| | | |
|---|---|---|
| DE | 298 20 723 U1 | 4/1999 |
| EP | 0 566 926 A1 | 10/1993 |
| JP | 10-151577 | 6/1998 |
| JP | 10-329056 | 12/1998 |
| WO | WO 92/09406 | 6/1992 |
| WO | WO 00/23727 | 4/2000 |

OTHER PUBLICATIONS

Patent Abstract Corresponding To JP 10–329056.
Derwent Abstract Corresponding To DE 298 20 723.
Patent Abstract Corresponding To JP 10–151577.
Patent Abstract Corresponding To EP 0 566 926.
N. Sclater and N. Chironis, "Mechanisms & Mechanical Devices Sourcebook," 2001, pp. 272–273, Third Edition, McGraw–Hill.
Bosch, Cordless Drill GBM 12 VES–2, http://etli.bosch–pt.com/printdirect.asp, 3 pages, Mar. 20, 1999.
Bosch, Cordless Drill GBM 12 Ves–3, http://etli.bosch–pt.com/printdirect.asp, 2 pages, Sep. 18, 1999.
Bosch, Drill GBM 32–4, http://etli.bosch–pt.com/printdirest.asp, 5 pages, May 17, 1999.
Bosch, Four Speed Rotary Drill GBM 32–4, www.bosch–pt.co.uk, 1 page, Mar. 10, 2003.

Primary Examiner—Dirk Wright
(74) Attorney, Agent, or Firm—Brooks Kushman P.C.

(57) ABSTRACT

The present invention discloses a portable electric rotary power tool having a plurality of gear reduction elements connected to a motor to receive a first output torque and drive an output spindle. At least two of the gear reduction elements have a common input member and a common output member. A shift actuator is in selective communication with the two gear reduction elements, so that in a first position, these elements are each in a locked mode for providing the first output torque to the spindle. In a second position, the first is in a reduction mode and the second is in a disengaged mode for providing a second output torque to the spindle. In the third position, the first of these elements is in the disengaged mode and the second is in the reduction mode for providing a third output torque to the spindle.

22 Claims, 6 Drawing Sheets

U.S. PATENT DOCUMENTS

| | | | |
|---|---|---|---|
| 5,176,593 A | 1/1993 | Yasui et al. |
| 5,277,527 A | 1/1994 | Yokota et al. |
| 5,339,908 A | 8/1994 | Yokota et al. |
| 5,550,416 A | 8/1996 | Fanchang et al. |
| 5,624,000 A | 4/1997 | Miller |
| 5,692,575 A | 12/1997 | Hellström |
| 5,704,433 A | 1/1998 | Bourner et al. |
| 5,730,232 A | 3/1998 | Mixer |
| 5,897,454 A | 4/1999 | Cannaliato |
| 5,954,144 A | 9/1999 | Thames |
| 5,967,934 A | 10/1999 | Ishida et al. |
| 6,070,675 A | 6/2000 | Mayer et al. |
| 6,086,502 A | 7/2000 | Chung |
| 6,093,130 A | 7/2000 | Buck et al. |
| 6,142,242 A | 11/2000 | Okukmura et al. |
| 6,202,759 B1 | 3/2001 | Chen |
| 6,223,833 B1 | 5/2001 | Thurler et al. |
| 6,244,984 B1 | 6/2001 | Dieterich |
| 6,305,481 B1 | 10/2001 | Yamazaki et al. |
| 6,401,572 B1 | 6/2002 | Provost |
| 6,431,289 B1 | 8/2002 | Potter et al. |
| 6,457,535 B1 | 10/2002 | Tanaka |
| 6,487,940 B2 | 12/2002 | Hart et al. |
| 6,502,648 B2 | 1/2003 | Milbourne |
| 6,599,219 B2 | 7/2003 | Pan |
| 6,655,470 B1 | 12/2003 | Chen |
| 2002/0049111 A1 | 4/2002 | Pan |
| 2002/0185290 A1 | 12/2002 | Tang |
| 2003/0143042 A1 | 7/2003 | Doyle et al. |
| 2003/0171185 A1 | 9/2003 | Potter et al. |

FIGURE 1

| GEAR SPEED RATIO | GEAR STAGE | | | | SHIFT ** SLEEVE |
|---|---|---|---|---|---|
| | I | II | III | IV | |
| HIGH | ACTIVE | LOCKED | LOCKED | ACTIVE* | ROTATABLE |
| MEDIUM | ACTIVE | ACTIVE | DISENGAGED | ACTIVE* | STATIONARY |
| LOW | ACTIVE | DISENGAGED | ACTIVE | ACTIVE* | STATIONARY |

FIGURE 4A
HIGH

FIGURE 4B
MEDIUM

FIGURE 4C
LOW

THREE SPEED ROTARY POWER TOOL

BACKGROUND OF THE INVENTION

1. Field of the Invention

The present invention relates to a rotary power tool, more particularly to a rotary power tool having a multiple speed transmission for providing at least three gear speed ratios.

2. Background Art

Rotary power tools are well known in the art and offer various operational features for allowing a user to operate a tool in a desired manner. For example, electric drills offer a wide variety of features to achieve such objectives. In the advent of cordless or battery operated power tools, more flexibility is provided to the user and various benefits are achieved including light weight, compactness, costs and others.

Cordless drills are generally low in torque and high in speed in comparison to conventional corded drills and have allowed manufacturers to use planetary gear sets rather than spur gears, as commonly utilized in the conventional corded drills. Planetary gear sets have allowed manufacturers and consumers to appreciate the benefits provided by planetary gear sets including a relatively low cost, compactness and a lightweight gear box. Utilization of planetary gear sets has further allowed the use of molded, polymeric or fiberglass reinforced polymeric gear sets offering suitable strength characteristics to translate an output torque, while being relatively light in weight.

Advancements in the cordless power tool art resulted in the utilization of adjustable clutches incorporated in the power tool between the transmission and an output tool holder for adjusting the torque output and preventing an overloading upon the motor. An examplary torque output device is disclosed in U.S. Pat. No. 5,277,527, issued on Jan. 11, 1994 to Ryobi Limited, and incorporated by reference herein. Another feature that has been provided to cordless drills is the incorporation of a multiple speed transmission, thus allowing a user to select a preferred output speed for the rotary operation. Multiple speed transmissions have existed in the art of corded drills, however they typically utilized multiple spur gears, thus adding to weight and size of the tool.

The prior art teaches various methods for providing multiple or variable speed rotary power tools. For example, U.S. Pat. No. 4,791,833, issued to Sakai et al., on Dec. 20, 1988, teaches a rotary power tool having a two-speed planetary gear set transmission wherein a ring gear is shiftable for either two-stage or three-stage gear reduction.

Accordingly, three-speed gear boxes have been utilized in the prior art for offering a wider range of speed selection to the user. For example, U.S. Pat. No. 4,418,766, issued to Grossman on Dec. 6, 1983, discloses a compact three speed gear box utilizing a plurality of spur gears for providing three output speeds from a corded drill. Bosch incorporated a similar design in a cordless drill, GBM 12 VES-3. Another three-speed gear box is disclosed in U.S. Pat. No. 6,431,289 B1, issued to Potter et al., on Aug. 13, 2002. The Potter '289 patent utilizes a pair of axially translatable ring gears within a multiple stage transmission having planetary gear sets for allowing at least three multiple gear speed ratios.

Another three-speed power tool is disclosed in U.S. Patent Application Publication No. 2002/0049111 A1. This reference teaches three planetary gear sets, all having a common input member and a common planet carrier. A shiftable sleeve selectively engages a ring gear of each planetary gear set for providing multiple gear speed reduction ratios.

With the benefits of cost, compactness, weight, and multiple speed output in consideration, the prior art teaches the utilization of either multiple actuation members, or an actuation member for engaging at least three gear stages in order to provide three or more gear speed ratios. Accordingly, a cordless power tool having a shift actuator for engaging at least two gear sets to provide at least three speeds of gear reduction is needed.

SUMMARY OF THE INVENTION

An object of the invention is to provide a portable electric rotary power tool having a multiple speed transmission. The power tool includes an electric motor oriented within a housing. The motor has a rotary output shaft for providing a first output torque. A plurality of gear reduction elements are included in the power tool, for receiving the first output torque and driving an output spindle. At least two of the gear reduction elements have a common input member and a common output member, and the at least two gear reduction elements each have a locked mode, a reduction mode, and a disengaged mode. A shift actuator is in selective communication with the two gear reduction elements, and has a first position wherein the two gear reduction elements are each in the locked mode for providing the first output torque to the spindle. The shift actuator has a second position wherein the first of the two gear reduction elements is in the reduction mode and the other is in the disengaged mode for providing a second output torque to the spindle. The shift actuator also has a third position wherein the first is in the disengaged mode and the other is in the reduction mode for providing a third output torque to the spindle.

A further aspect of the invention defines the two gear reduction elements as planetary gear sets, each including a sun gear, a plurality of planet gears oriented about and engaged with the sun gear, a planet carrier, to which each of the planet gears is fixed for rotation, and a ring gear oriented about and engaged with the plurality of planet gears.

According to another aspect of the invention, the shift actuator is an axially translatable sleeve wherein, in the first position, the shift actuator engages the planet carrier and ring gear of the first planetary gear set for locking the first and second planetary gear sets relative to the common input member in the locked mode so that the first output torque is transmitted to the spindle. In the second position, the shift actuator engages the ring gear of the first planetary gear set and the housing for securing the ring gear of the first planetary gear set relative to the housing, so that the first output torque is received by the first planetary gear set in the reduction mode and the second planetary gear set is in the disengaged mode so that the second output torque is transmitted to the common output member. In the third position, the shift actuator engages the ring gear of the second planetary gear set and the housing for securing the ring gear of the second planetary gear set relative to the housing in the reduction mode and the first planetary gear set is in the disengaged mode so that the first output torque is received by the second planetary gear set and the third output torque is transmitted to the spindle.

Yet another aspect of the invention defines the first and second planetary gear sets as having a common input member wherein the respective sun gears are fixed relative to one another, and wherein the common output member is a common planet carrier for both the first and second planetary gear sets. The shift actuator is further defined as an axially translatable common input member or an axially translatable planet carrier for providing the three positions resulting in the three multiple gear speed reduction ratios.

DETAILED DESCRIPTION OF THE PREFERRED EMBODIMENTS

Figure 1:
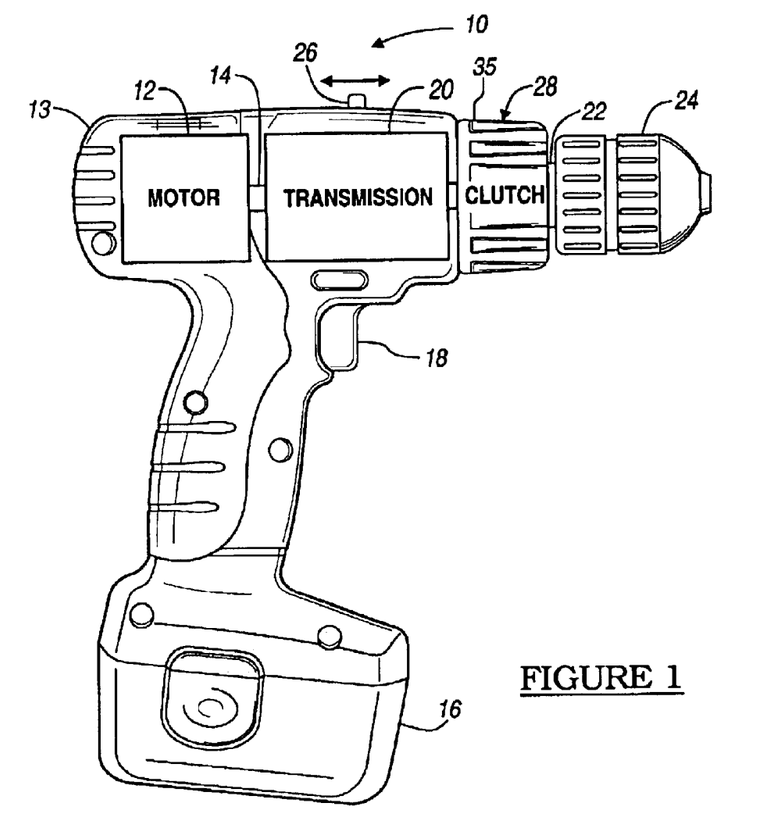
FIG. 1 is a right side elevation view of a preferred embodiment power tool in accordance with the present invention.

Referring now to FIG. 1, a preferred embodiment portable electric rotary power tool is illustrated in accordance with the present invention and referenced generally by numeral 10. The power tool is illustrated as a battery operated, direct current, electric drill, however any portable electric rotary power tool is contemplated within the scope and spirit of the invention. The power tool 10 includes an electric motor 12 oriented within a housing 13. The motor 12 has a rotary output shaft 14 for providing a first output torque. The motor 12 is connected to a power source for imparting a rotation to the rotary output shaft 14. Such a power source may be a direct current battery 16, as illustrated, or an alternating current power supply, or the like. The power tool 10 includes a trigger button 18 for closing the circuit between the power supply and the motor 12, thus allowing a user to selectively impart the first output torque to the rotary output shaft 14.

The power tool 10 includes a transmission 20 for reducing the rotation speed of the output provided by the motor 12 and transmitting a correspondingly increased output torque to an output spindle 22 of the power tool 10. A tool holder or chuck 24 is affixed to the spindle 22 for retaining a bit and consequently imparting a torque thereto. The power tool 10 includes a multiple speed selector switch 26 in communication with the transmission 20 for allowing a user to select multiple output speeds of the power tool 10. The power tool also preferably includes a clutch 28 for preventing an excessive loading on the motor 12 or the workpiece such as a screw, being driven by the chuck 24.

Figure 2:
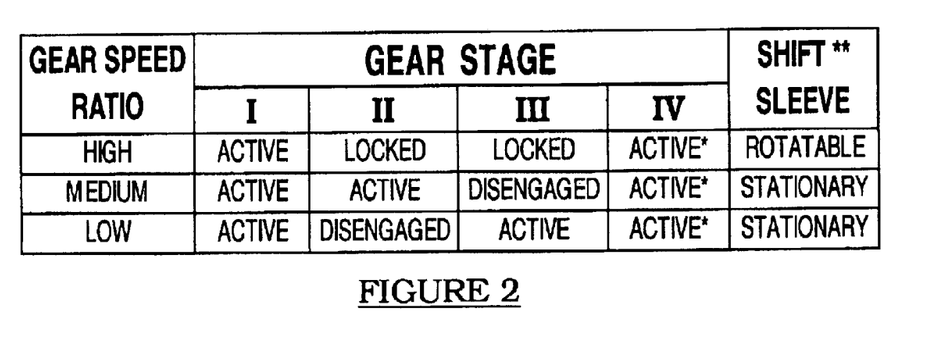
FIG. 2 is a table illustrating the operation of each gear stage for each gear speed ratio.

With reference now to FIG. 2, a table is illustrated to explain the operation of the transmission 20 in further detail. The transmission 20 of the preferred embodiment includes four gear reduction elements or gear stages and is operable in at least three multiple gear speed ratios, indicated as high, medium, and low. For each speed, the operation of each gear stage is indicated. The order of the gear stages is not crucial. Preferably the gear stages are arranged so that two adjacent gear stages a re operable in a locked mode, an active mode, and a disengaged mode. These gear stages I through IV are numbered in order from the motor 12 to the spindle 22 in the preferred embodiment. Accordingly, one or more of gear stages I and IV can be removed, or additional ones can be added, or the stages may be placed in various orders or arrangements within the scope of the present invention. Each gear stage has an input member to receive an input torque and an output member to provide an output torque. Accordingly, the input member of gear stage I receives the first output torque from the motor. Further, at least two of the gear stages have a common input member and a common output member and the at least two gear stages each have a locked mode, a reduction mode, and a disengaged mode. These two gear stages are indicated by gear stages II and III in the chart.

In a first position of the selector switch 26, the power tool 10 is in the high gear speed ratio. Gear stage I is in the active mode. The active mode is defined wherein the gear stage is operating as a gear reduction element. One having ordinary skill in the art will recognize that reduction refers to a reduction of speed and therefore also results in an increase in torque. For the purposes of this description, the reduction or active mode refers to wherein the gear stage receives a torque from the input member and provides an increased torque and reduced speed to the output member.

In the high gear speed ratio, gear stages II and III are in an inactive mode. The high gear speed ratio is described below in detail with reference to FIG. 4a. An inactive mode is wherein the gear stage does not provide a gear reduction between the input member and the output member. More particularly, in the high gear speed ratio, gear stages II and III are in a locked mode. The locked mode for a particular gear stage is defined wherein the input member and the output member are locked relative one another for direct rotation and torque translation. More particularly, gear stage II is in a direct, locked mode, wherein the input member and output member are locked, and the input torque is directly translated through the gear stage. Gear stage III is consequently in the locked mode because it shares the common input member and common output member with gear stage II, and these common input and output members are locked via gear stage II, transmitting the torque from the common input member to the output member through gear stage H. Alternatively, gear stage III could be in a direct, locked mode for transmitting torque directly from the common input member to the common output member. In this alternative manner, gear stage II would also be locked because its common input and output members would be locked via gear stage III, transmitting the torque directly through gear stage III.

Gear stage IV directly receives the second output torque from gear stage 1. Gear stage IV is also in the active mode for providing a gear reduction to the input torque received. The asterisk in the chart next to the word 'Active' is to indicate that gear stage IV is not always in the active mode. Gear stage IV in the preferred embodiment is operably connected to the clutch 28 such that gear stage IV operates in a partially active mode, or an inactive mode when the output torque exceeds a specific torque limit of the motor 12. Therefore, the clutch 28 prevents an overload upon the motor 12, thus enhancing the life of the power tool 10. The clutch 28 may also allow a user to select a specified torque, so that an output torque does not exceed that which is required for a specific rotary operation such as driving wood screws.

The disengaged mode is defined wherein the gear stage does not perform a gear reduction, and the input member and output member are not locked relative to one another.

Beyond the gear stage columns in the table of FIG. 2, a shift sleeve column is located as indicated with the double asterisks. The shift sleeve column is to indicate the operation of a shift sleeve of the transmission 20. The shift sleeve will be discussed in further detail below in reference to FIGS. 3, 4a, 4b and 4c. The shift sleeve is characteristic of the transmission 20 of the preferred embodiment only and does not pertain to the alternative embodiments schematically illustrated in FIGS. 5 and 6. Absent the shift sleeve column, the remainder of the table relates to all embodiments disclosed herein.

Referring to FIG. 2, the medium gear speed ratio is dictated by a second position of the selector switch 26. This ratio will also be described with reference to FIG. 4b, as well. The selector switch 26 is in selective communication with the transmission 20 for actuating gear stages II and III between the various modes. Accordingly, gear stage I remains in the active mode receiving the first input torque and providing the second output torque. Gear stage II is now in the active mode receiving the second output torque and providing a third output torque. Gear stage III is disengaged such that the common input member and common output member are not in communication through gear stage III. However, gear stages II and III having the common output member allow gear stage IV to receive the third output torque. Gear stage IV remains in the active mode and provides a further gear reduction to the third output torque.

Figure 4A:
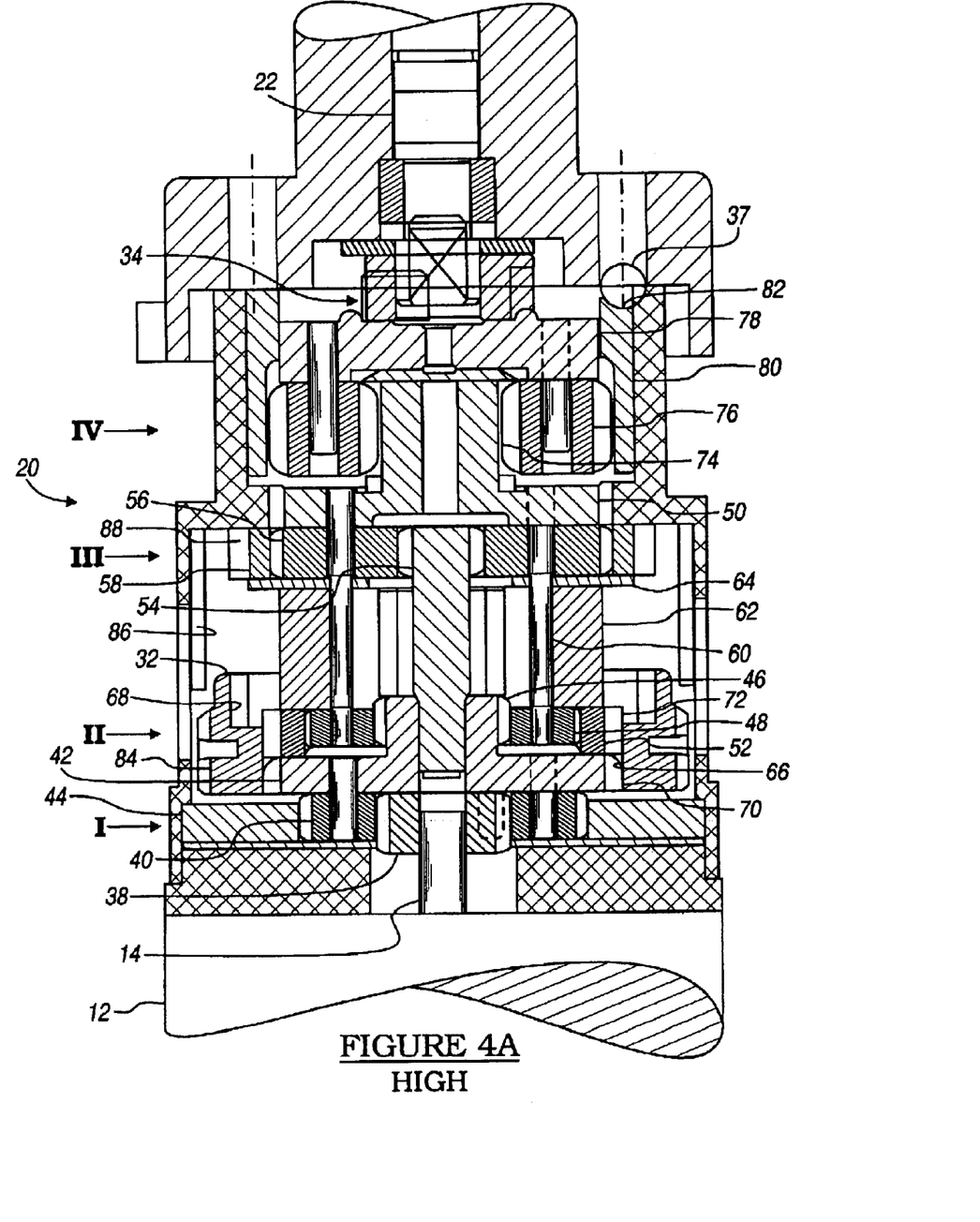
FIG. 4a is an enlarged section view of the power tool transmission of FIG. 3, illustrating a high gear speed ratio.
Figure 4B:
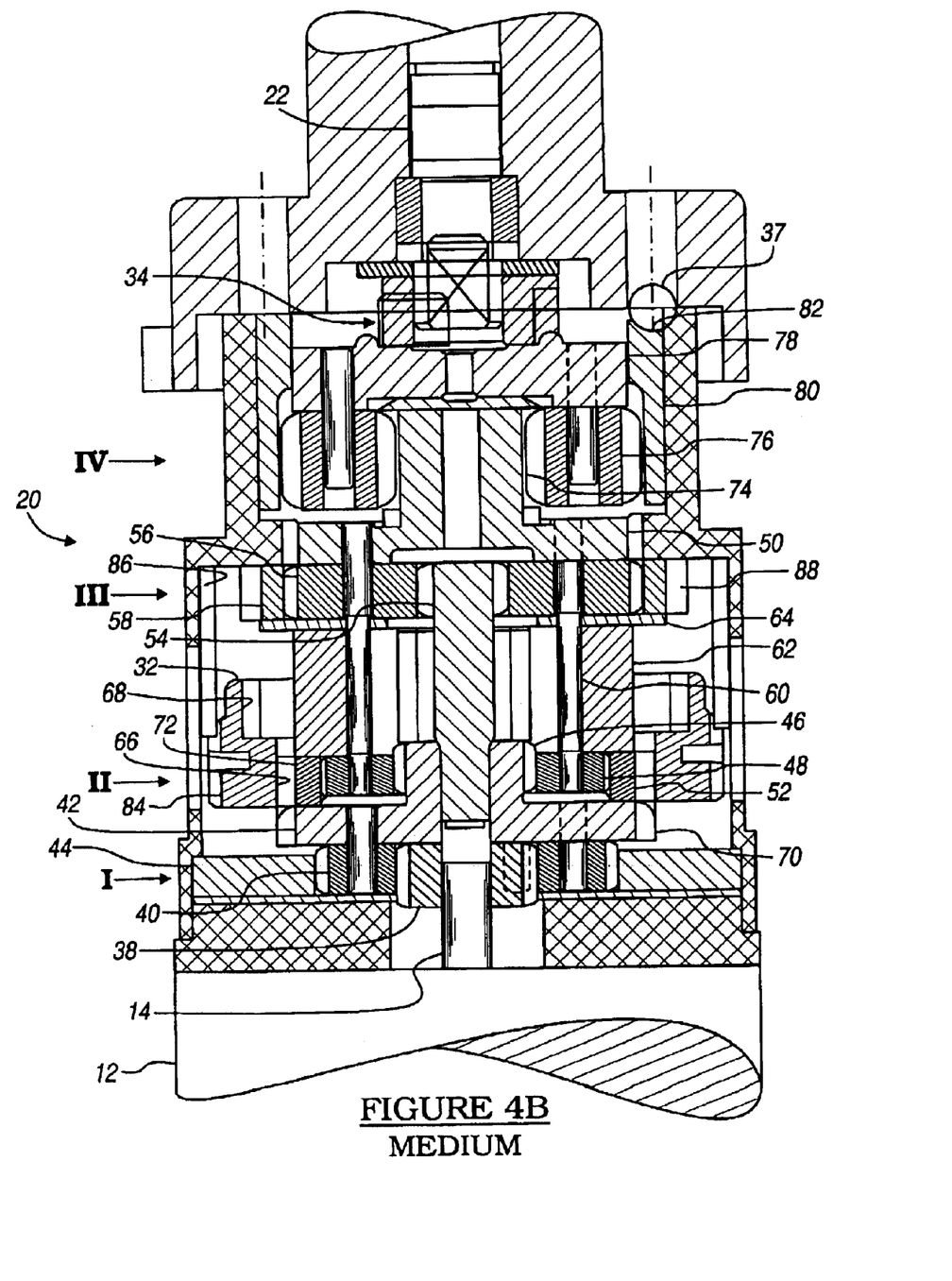
FIG. 4b is an enlarged section view of the transmission of FIG. 3, illustrating a medium gear speed ratio.
Figure 4C:
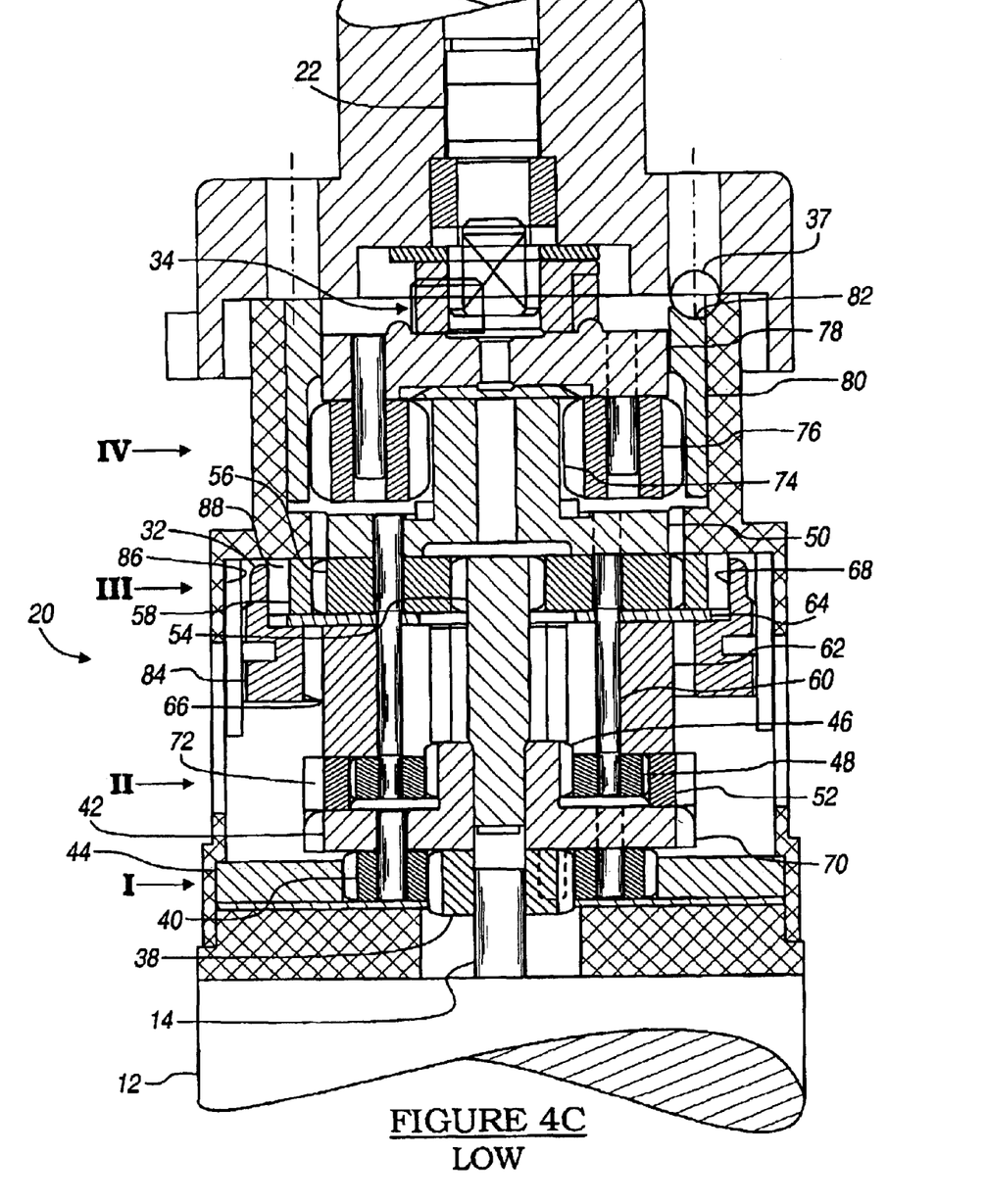
FIG. 4c is an enlarged section view of the transmission of FIG. 3, illustrating a low gear speed ratio.

Referring now to the low gear speed ratio of FIGS. 2 and 4c, the selector switch 26 is now in the third position. Gear stage I is still active, gear stage II becomes disengaged, gear stage III is now active, and gear stage IV remains active. Although gear stage II is disengaged, gear stage III shares a common input member with gear stage II, thus receiving the second output torque from gear stage I. Gear stage III provides a gear reduction to the second output torque thus providing a fourth output torque. Gear stage IV receives the fourth output torque and provides a further gear reduction. For the high, medium, and low gear speed ratios, gear stage IV receives the second, third, and fourth output torques, respectively, and provides a fifth output torque, a sixth output torque and a seventh output torque, respectively.

In summary, the preferred transmission 20 has four gear stages for providing a high gear speed ratio in a two-stage gear reduction, a medium gear speed ratio in a three-stage gear reduction, and a low gear speed ratio in another three-stage gear reduction. For the preferred embodiment power tool 10, having four distinct gear stages, the gear speed reduction ratio for rotations of the output shaft 14 per rotations of output spindle 22 for the high gear speed ratio is 11.1:1; for the medium gear speed ratio is 33.3:1; and for the low gear speed ratio is 66.6:1. As a result of these ratios and the input speed, the free mode speed of the output spindle 22 and chuck 24 is 2000 rpm (rotations per minute) as a result of the high gear speed ratio, 700 rpm for the medium gear speed ratio and 300 rpm as a result of the low gear speed ratio.

The preferred embodiment power tool 10 requires only a pair of shiftable gear stages. This design provides relative compactness such that four coaxial gear stages may be included within the housing 13 of the power tool 10. Accordingly, a broad range of speed separation is provided to the user with at least three broadly separated gear speeds. The multiple gear stages provide for gears having fewer teeth and consequently larger gear teeth which are suitable for the torques transmitted therethrough. Accordingly, the compactness which allows the incorporation of the multiple gear stages allows gears of enhanced durability resulting in a tool that is both flexible to the user's requirements and durable.

The materials required to manufacture the gearing elements of the individual gear stages will of course be a result of the torque requirements. For a low output torque power tool, the gearing elements may be manufactured from a molded polymeric material which may also be fiber reinforced. For a power tool having a higher output torque, a material such as powder metal may satisfy the torque requirements, at least for the gear stages experiencing the highest torque, for example gear stage IV. The invention contemplates that a combination of these materials may be utilized, having polymeric gearing elements for the high speed and low torque gear stages and powder metal gearing elements for the high torque and low speed gear stages. With reference again to the preferred embodiment power tool 10, the material of the gearing elements of the gear stages I thru IV is powder metal or hardened steel.

Referring now to FIGS. 3, 4a, 4b, and 4c, the transmission 20 of the preferred embodiment power tool 10 is illustrated in greater detail. The transmission 20 may include a housing that immediately surrounds the components of the transmission 20, as illustrated. One of ordinary skill in the art may refer to the housing about the transmission as a transmission housing, or the transmission 20 and the corresponding housing may be collectively referred to as a gearbox. However, for the purpose of this application, the housing 13 of the power tool 10 and the housing about the transmission 20 are collectively referred to, generally as housing 13.

Figure 3:
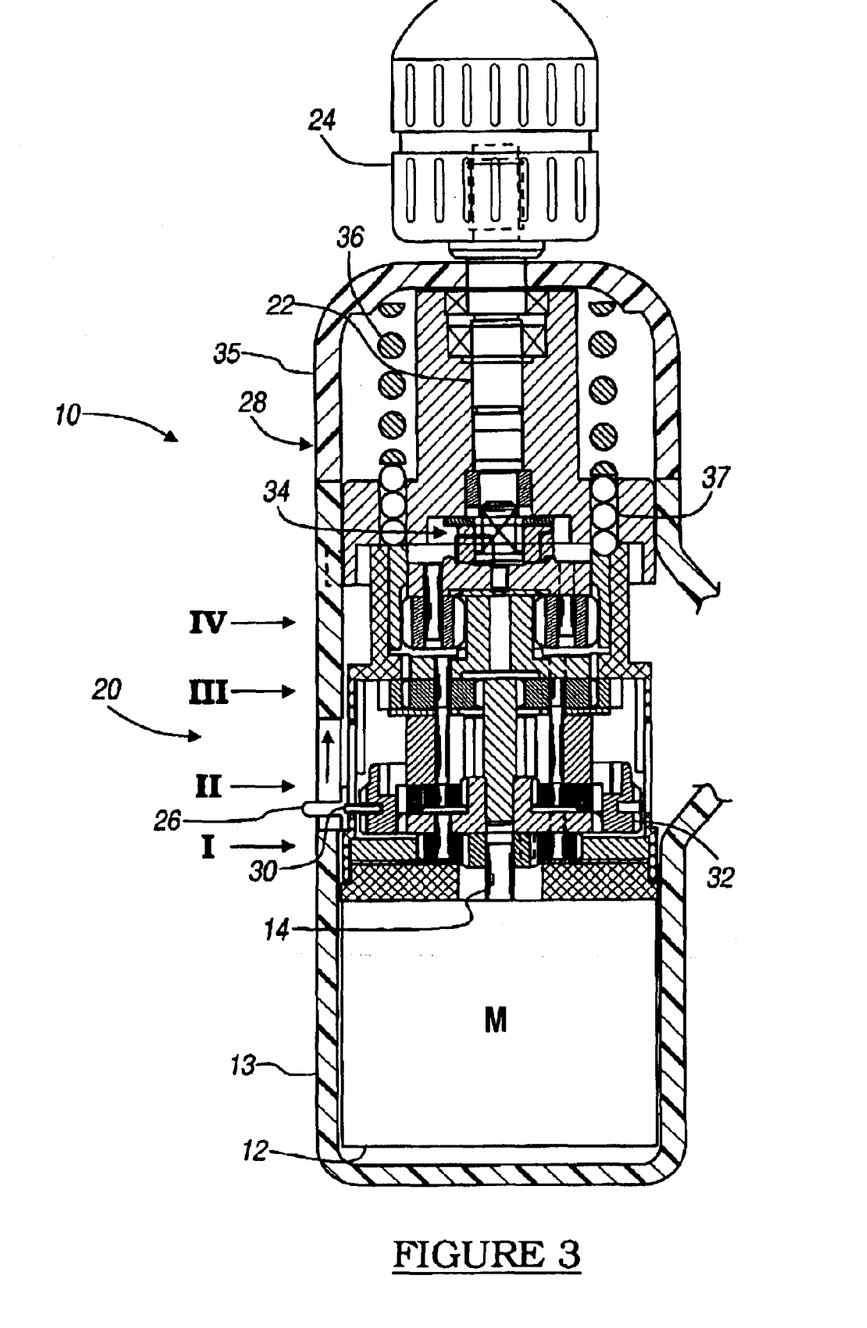
FIG. 3 is a longitudinal, partial section view of the power tool of FIG. 1, illustrating a transmission of the power tool.

FIG. 3 illustrates the interrelation of the components of power tool 10 from the motor 12 to the chuck 24. The transmission 20 is further defined as a plurality of planetary gear sets cooperating in four distinct stages. Gear stages II and III are illustrated having the common input member and the common output member and are actuated between the active, locked, and disengaged modes by actuation of the selector switch 26 by the user. Accordingly, the power tool 10 is illustrated in the high gear speed ratio with the selector switch 26 in the first position. The selector switch 26 is axially translatable relative to the housing 13 of the power tool 10. The selector switch 26 actuates a shift fork 30. The shift fork 30 extends from the selector switch 26 about an axially translatable shift sleeve 32. The shift sleeve 32 includes a circumferential groove formed therein within which the shift fork 30 is disposed. Preferably, the shift sleeve 32 is formed of nylon, however any polymeric material is contemplated.

The rotary output shaft 14 of the motor 12 is coupled to the input member of gear stage I for providing the first input torque. Gear stage IV is coupled to the spindle 22 through an alignment coupling 34. The clutch 28 includes an external clutch cap 35 for selective rotation by the user. The rotational positioning of the clutch cap 35 regulates the compression load imparted to a compression spring 36 that is generally coaxial with the spindle 22. The compression spring 36, in turn, imparts a force upon a plurality of ball bearings 37 that are retained relative to the transmission 20. The ball bearings 37 are engaged with gear stage IV such that gear stage IV becomes disengaged upon an excessive exerted torque. A torque adjustment device has been described in further detail in U.S. Pat. No. 5,277,527, which has been incorporated for reference herein.

Referring now to FIG. 4a, the operation of the transmission 20 in the high speed gear ratio is illustrated in further detail. The output shaft 14 of the motor 12 is coupled for rotation with a first sun gear 38 of gear stage I. Gear stage I includes a first plurality of planet gears 40 oriented about and engaged with the first sun gear 38. The first planet gears 40 are each fixed for rotation relative to a first planet carrier 42, which is generally coaxial with the first sun gear 38 and the motor 12. The first gear stage I further includes a first ring gear 44 oriented about and engaged with the first planet gears 40. The first ring gear 44 is generally coaxial with the motor 12 and is fixed relative to the housing 13. Accordingly, the first sun gear 38 receives the first input torque from the rotary output shaft 14. The first planetary gear set of stage I reduces the rotation speed of the first sun gear 38 as the first planet gears 40 cooperate between the first sun gear 38 and the first ring gear 44, consequently imparting a reduced rotation and the second output torque to the first planet carrier 42. The gear elements of gear stage I are preferably formed from powder metal.

The first planet carrier 42 drives a second sun gear 46 affixed thereto. The second sun gear 46 defines the input member of gear stage II. Gear stage II also includes a plurality of second planet gears 48 oriented about and engaged with the second sun gear 46. The second planet gears 48 are each fixed for rotation to a second planet carrier 50. A second ring gear 52 is oriented about and engaged with the second planet gears 48. The gear elements of gear stage II are preferably formed from powder metal.

Gear stage III shares a common input member with gear stage II, which is defined as a third sun gear 54 that is fixed for rotation with the second sun gear 46. The third sun gear 54 is preferably formed from hardened steel. Gear stage III is formed by a third planetary gear set including a plurality of third planet gears 56 which are each spaced about and engaged with the third sun gear 54 and are also each fixed for rotation relative to the second planet carrier 50. A third ring gear 58 is oriented about and engaged with the third planet gears 56. The third planet gears 56 and third ring gear 58 are preferably formed from powder metal.

The third planet gears 56 have an external diameter much greater than that of the second planet gears 48, and the third sun gear 54 has a diameter much smaller than that of the second sun gear 46, so that planetary gear stage III provides a gear reduction much greater than that of gear stage II. In order to provide selective engagement of the shift sleeve 32 with gear stage II and gear stage III, these gear stages are generally spaced apart. Accordingly, the second planet gears 48 are extended from the second planet carrier 50 by a plurality of longitudinal gear shafts 60. The third planet gears 56 may share common gear shafts with those of the second planetary gears, or may have a separate plurality of gear shafts which are spaced in a pattern to not interfere with the gear shafts 60 of the second planet gears 48. The third sun gear 54 is also spaced away from the second sun gear 46 and may be formed as a separate component, as illustrated, or may be formed integrally with the second sun gear 46 and/or the first planet carrier 42.

The second ring gear 52 and the third ring gear 58 are rotatable relative to the housing 13. Therefore, in order to maintain the longitudinal position of these ring gears, a first spacer 62 and a second spacer 64 are utilized between the second ring gear 52 and the third ring gear 58. The first spacer 62 has an outside diameter sufficient to contact both the second ring gear 52 and the second spacer 64 and has an internal diameter sized to provide clearance for the gear shafts 60. The second spacer 64 contacts the first spacer 62 and the third ring gear 58. Accordingly, the second spacer 64 has an external diameter sufficient to engage a side of the third ring gear 58 and has an internal diameter sufficient to provide clearance for the gear shaft 60. The first spacer 62 and the second spacer 64 may be formed integrally or as separate components.

The shift sleeve 32 includes a first internal spline 66 and a second internal spline 68 formed therein. The first planet carrier 42 further includes an external spline 70 that is sized to lock within the first internal spline 66. The second ring gear 52 also includes an external spline 72 that is sized to lock within the first internal spline 66. In the first position of both the selector switch 26 and shift actuator sleeve 32, the first internal spline 66 engages both the external spline 70 of the first planet carrier 42 and the external spline 72 of the second ring gear 52, thus locking them for rotation to one another. This locking engagement subsequently locks the second planet gears 48 relative to the second sun gear 46 such that the second planet carrier is locked relative to the second sun gear 46. Therefore, gear stage II is in the locked mode, having its output member, second planet carrier 50, locked relative to its input member, second sun gear 46. Gear stage III is also in the locked mode, having a common input member and common output member with gear stage II. The third sun gear 54 is also locked relative to the second planet carrier 50, as are the third planet gears 56 and third ring gear 58. In this manner, gear stage II, shift actuator sleeve 32, and gear stage III are all locked and rotate directly, thus translating the second output torque from the first planet carrier 42 to the second planet carrier 50. Rather than being a conventional spline configuration, any slot and groove or similar configuration is contemplated for rotationally locking these components relative to one another.

A fourth sun gear 74 is fixed to the second planet carrier 50 for receiving an input torque from the second planet carrier 50. A plurality of fourth planet gears 76 are oriented about and engaged with the fourth sun gear 74. The fourth planet gears 76 are each fixed for rotation to a third planet carrier 78, which is coaxial with the motor 12. A fourth ring gear 80 is oriented about and engaged with the fourth planet-gears 76. The fourth ring gear 80 is secured relative to the housing 13 by the clutch 28. More particularly, the fourth ring gear 80 includes a series of detents 82 for partially receiving the ball bearings 37. When a torque is imparted upon the fourth ring gear 80 that exceeds that permitted by the force imparted by the ball bearings 37, the fourth ring gear 80 slips within the housing 13 causing the fourth planet gears 76 to slow, thus reducing the rotational speed of third planet carrier 78. Accordingly, gear stage IV is partially active, because the output member or third planet carrier 78 is no longer driven by the input member or fourth sun gear 74 at full speed and limited output torque is imparted to the spindle 22. However, when a prescribed torque limit is not exceeded, the force of the compression spring 36 upon the ball bearings 37 secures the fourth ring gear 80 relative to the housing 13, thus maintaining gear stage IV in the active mode. Gear stage IV receives the second output torque and provides the fifth output torque to the spindle 22. The gear elements of gear stage IV are preferably formed of powder metal.

Referring now to FIG. 4b, the transmission 20 is illustrated in the medium gear speed ratio as the shift sleeve 32 is moved to the second position by the user. The shift sleeve 32 includes an external spline 84 formed thereabout. A corresponding internal spline 86, sized to receive the external spline 84, is formed within the housing 13 or the transmission housing. Rather than being a conventional spline configuration, any slot and groove or similar configuration is contemplated for rotationally locking these components relative to one another.

In the second position of the sleeve 32, the external spline 84 engages the internal spline 86 and prevents rotation of the sleeve 32 relative to the housing 13 causing the sleeve 32 to become stationary. Also, in the second position, the first internal spline 66 of the sleeve 32 disengages from the first planet carrier 42. The sleeve 32 continues engagement with the external spline 72 of the second ring gear 52, thus locking it relative to the housing 13. In this manner, gear stage II and gear stage III both become unlocked relative to the common input member. Further, gear stage II is operable in the active mode for providing a gear reduction to the second input torque. The second planet gears 48 are driven by the second sun gear 46 and rotate about the second sun gear 46, within the second ring gear 52 for providing a reduced rotation to the second planet carrier 50. Gear stage III is in the disengaged mode because the third sun gear 54 is disengaged from the second planet carrier 50. The third ring gear 58, being free to rotate relative to the housing 13, causes the third planet gears 56 to idle, thus disengaging the third sun gear 54 from the second planet carrier 50. Accordingly, gear stage II receives the second output torque and provides the third output torque to the second planet carrier 50 and fourth sun gear 74. The third output torque is subsequently translated by gear stage IV into the sixth output torque to the spindle 22.

Referring now to FIG. 4c, the shift sleeve 32 is illustrated in the third position, thus actuating the rotary power tool into the low gear speed ratio. The third ring gear 58 includes an external spline 88 which is sized to cooperate with the second internal spline 68 of the sleeve 32. Further, in the third position, the external spline 84 continues to engage the internal spline 86 for fixing the sleeve 32 in a stationary orientation relative to the housing 13. In the third position, the sleeve 32 no longer cooperates with the second ring gear 52. In this position, gear stage II becomes disengaged as the second planet gears 48 idle and disengage the second planet carrier 50 from the second sun gear 46.

In the third position, gear stage III is in the active mode. The third ring gear 58 becomes fixed relative to the housing 13 by the sleeve 32 so that the third planet gears 56 become active, rotating within the third ring gear 58 as they are driven by the third sun gear 54. The third planet gears 56 collectively provide a reduced rotation from the third sun gear 54 to the second planet carrier 50. In the third position, gear stage III receives the second output torque from the third sun gear 54 and provides a fourth output torque to the second planet carrier 50 and the fourth sun gear 74. Consequently, gear stage IV receives the fourth output torque and provides the seventh reduced output torque.

Figure 5:
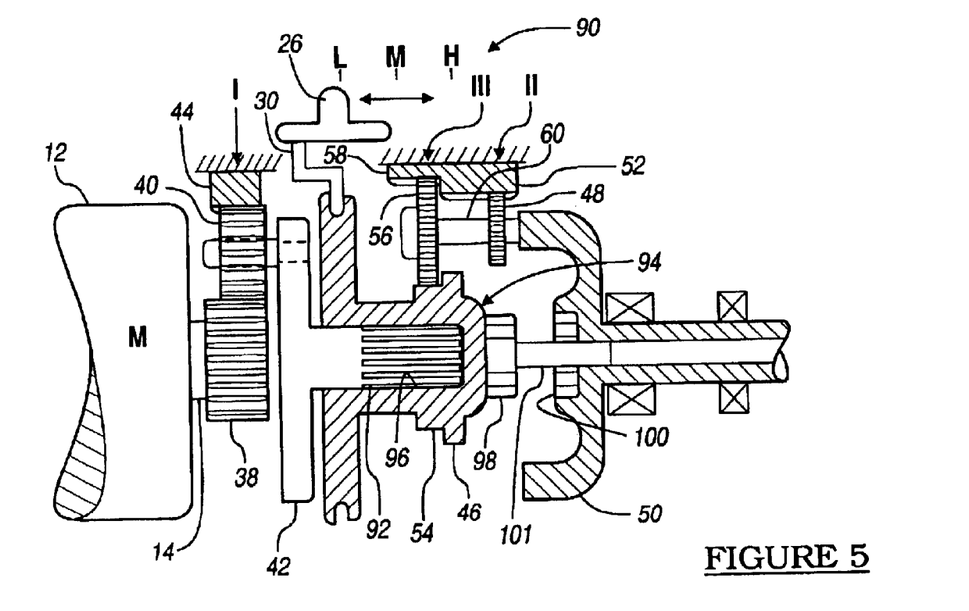
FIG. 5 is a longitudinal, partial section, schematic view of an alternative embodiment transmission in accordance with the present invention.

Referring now to FIG. 5, an alternative embodiment power tool transmission 90 is illustrated in partial section view. Please note that similar elements retain the same reference numerals, wherein new elements are assigned new reference numerals. Although three gear stages are illustrated, the invention contemplates any number of gear stages greater than or equal to two. The transmission 90 is similar to the previous embodiment, however, rather than having an axially translatable sleeve, the common input member to gear stages II and III is axially translatable. Further, FIG. 5 is a schematic representation, only partially illustrating each ring gear, and illustrating one planet gear for each gear stage, where an array of planet gears is contemplated.

The first planet carrier 42 includes a longitudinal external spline 92 extending therefrom. The common input member includes an input portion 94, which has an internal spline 96 for coupling it for rotation with the first planet carrier 42. The selector switch 26 actuates the shift fork 30, which subsequently actuates the input portion 94. The input portion 94 includes an external socket configuration 98 sized to be received within an internal socket recess 100 formed within a forward hub of the second planet carrier 50. The input portion 94 may also include a pilot 101 received within a central bore of the second planet carrier 50 for providing additional bearing support to the input portion 94.

In the first position, or high gear speed ratio, the input portion 94 is extended forward such that the socket configuration 98 engages socket recess 100 for locking gear stage II and gear stage III such that direct torque translation is provided from the first planet carrier 42 to the second planet carrier 50. Accordingly, both gear stages II and III are in the locked mode in the first position.

In the second position, or medium gear speed ratio, the common input member 94 is shifted to a position for actuating gear stage II into the reduction mode and disengaging gear stage III. The common input member 94 includes the second sun gear 46 formed thereabout for engaging the second planet gears 48 in this position. In this embodiment, the second ring gear 52 and third ring gear 58 are fixed relative to the housing 13 such that the second sun gear 46 engages the second planet gears 48. The second output torque is received by gear stage II and the third output torque is imparted to the second planet carrier 50. In the second position, the third sun gear 54 is disengaged from the third planet gears 56. The third planet gears 56 are free to rotate relative to the second planet gears 48 to allow continuous engagement with the respective ring gears.

As illustrated, in the third position of the selector switch 26 and concurrently the low gear speed ratio, the common input member 94 is actuated to a third position wherein the second sun gear 46 disengages from the second planet gears 48 and the third sun gear 54 becomes engaged with the third planet gears 56. Accordingly, gear stage II becomes disengaged and gear stage III is in the reduction mode for receiving the second output torque and providing the fourth output torque to the second planet carrier 50. In this embodiment, gear stages II and III alternate longitudinal locations, however, the operational modes of the gear stages and output torques remain generally equivalent with that of the preferred embodiment.

Figure 6:
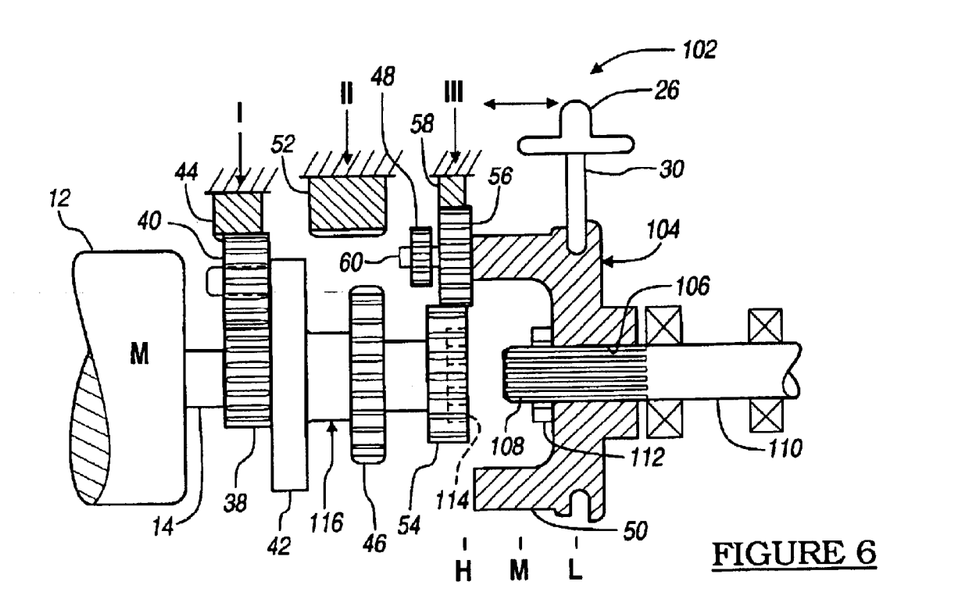
FIG. 6 is longitudinal, partial section, schematic view of another alternative embodiment transmission, also in accordance with the present invention.

Referring now to FIG. 6, an alternative embodiment power tool transmission 102 is illustrated in a schematic and partially sectioned view, having an axially translatable planet carrier 104 as the common output member of gear stages II and III. The axially translatable planet carrier 104 defines the second planet carrier 50, to which the second planet gears 48 and third planet gears 56 are each fixed for rotation. The axially translatable planet carrier 104 includes an internal spline 106, which is engaged to an external spline 108 formed about an output shaft 110. The output shaft 110 is subsequently coupled to the input member of a subsequent gear stage, not shown, or the output spindle 22. The selector switch 26 is actuated by the user to shift the selector switch 26, the shift fork 30, and the axially translatable planet carrier 104.

The axially translatable planet carrier 104 includes an external socket configuration 112 for interlocking the axially translatable planet carrier 104 with a socket recess 114 formed within a common input member 116. The common input member 116 includes the first planet carrier 42, the second sun gear 46, and the third sun gear 54. In the first position of the speed selector 26, the power tool transmission 102 is in a high gear speed ratio. In this position, the socket 112 engages the socket recess 114 for a direct drive between the common input member 116 and the axially translatable planet carrier 104. Accordingly, gear stages II and III are both in the locked mode having a locked input member and output member.

In the second position of the speed selector switch 26, the socket 112 and socket recess 114 disconnect and the second planet gears 48 engage both the second ring gear 52, which is fixed relative to the housing 13, and the second sun gear 46. In the second position, the third planet gears 56 are disengaged from the first sun gear 54. Therefore, in this position, gear stage II is in the reduction mode and gear stage III is disengaged. Accordingly, gear stage II receives the second output torque from gear stage I and provides the third output torque to the axially translatable planet carrier 104 and subsequently the output shaft 110. The second and third planet gears 48, 56 may be formed integrally and therefore only mesh with respective ring gears when meshed with the respective sun gears in the active mode.

In the third position of the speed selector switch 26, as illustrated, the power tool transmission 102 is in the low speed gear ratio wherein gear stage II becomes disengaged and the third planet gears 56 mesh with the third ring gear 58 and the third sun gear 54. In this configuration, gear stage III receives the second output torque from gear stage I and provides the fourth output torque to the axially translatable planet carrier 104 and output shaft 110.

In summary, the present invention teaches a cost-effective power tool having a transmission for providing at least three speeds by shifting only one actuator member to three different positions among two gear stages.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable electric rotary power tool having a multiple speed transmission, the power tool comprising:
   a housing;
   an electric motor oriented within the housing, the motor having a rotary output shaft for providing a first output torque;
   a plurality of gear reduction elements, each having an input member to receive an input torque and an output member to provide an output torque, wherein at least one of the input members is operably connected to the rotary output shaft to receive the first output torque, and wherein at least two of the gear reduction elements have a common input member and a common output member, and the at least two gear reduction elements each have a locked mode, a reduction mode and a disengaged mode;
   a shift actuator in selective communication with the at least two gear reduction elements; and
   an output spindle operably driven by one of the output members;
   wherein the shift actuator has a first position wherein the at least two gear reduction elements are each in the locked mode, for providing the first output torque to the spindle, the shift actuator has a second position wherein the first of the at least two gear reduction elements is in the reduction mode and the second of the at least two gear reduction elements is in the disengaged mode for providing a second output torque to the spindle, the shift actuator has a third position wherein the first of the at least two gear reduction elements is in the disengaged mode and the second of the at least two gear reduction elements is in the reduction mode for providing a third output torque to the spindle.

2. The power tool of claim 1, wherein the power tool is further defined as a battery operated, direct current, electric drill.

3. The power tool of claim 1, wherein the ratio of rotation of the motor output shaft to the rotation of the output spindle is between ten and twelve to one in the first position of the shift actuator.

4. The power tool of claim 1, wherein the ratio of rotation of the motor output shaft to the rotation of the output spindle is between thirty and thirty-six to one in the second position of the shift actuator.

5. The power tool of claim 1, wherein the ratio of rotation of the motor output shaft to the rotation of the output spindle is between sixty and seventy-two to one in the third position of the shift actuator.

6. The power tool of claim 1, wherein the at least two gear reduction elements are both further defined as planetary gear sets, each set including a sun gear defining the input member, a plurality of planet gears oriented about and engaged with the sun gear, a planet carrier, to which each of the planet gears is fixed for rotation and a ring gear oriented about and engaged with the plurality of planet gears.

7. The power tool of claim 6, wherein the sun gear of the second planetary gear set is fixed to the sun gear of the first planetary gear set, thus defining the common input member.

8. The power tool of claim 6, wherein the planet carrier of the second planetary gear set is fixed to the planet carrier of the first planetary gear set, thus defining the common output member.

9. The power tool of claim 6, wherein the shift actuator is further defined as an axially translatable sleeve wherein, in the first position, the shift actuator engages the planet carrier and ring gear of the first planetary gear set for locking the first and second planetary gear sets relative to the common input member in the locked modes so that the first output torque is transmitted to the spindle, in the second position, the shift actuator engages the ring gear of the first planetary gear set and the housing for securing the ring gear of the first planetary gear set relative to the housing so that the first output torque is received by the first planetary gear set in the reduction mode and the second planetary gear set is in the disengaged mode so that the second output torque is transmitted to the common output member, in the third position, the shift actuator engages the ring gear of the second planetary gear set and the housing for securing the ring gear of the second planetary gear set relative to the housing in the reduction mode and the first planetary gear set is in the disengaged mode so that the first output torque is received by the second planetary gear set and the third output torque is transmitted to the spindle.

10. The power tool of claim 6, wherein the first and second ring gears are fixed relative to the housing; and
   wherein the shift actuator is further defined as an axially translatable portion of the common output member, the shift actuator including the planet carrier of the first and second planetary gear sets, and the first and second pluralities of planet gears wherein, in the first position, the shift actuator engages the common input member for locking the common output member relative to the common input member in the locked modes of the first and second planetary gear sets so that the first output torque is transmitted to the spindle, in the second position, the first plurality of planet gears engage the first sun gear and the first ring gear so that the first output torque is received by the first planetary gear set in the reduction mode, and the second planetary gear set is in the disengaged mode so that the second output torque is transmitted to the common output member, in the third position, the first planetary gear set is in the disengaged mode and the second plurality of planet gears engage the second sun gear and the second ring gear so that the first output torque is received by the second planetary gear set in the reduction mode and a third output torque is transmitted to the spindle.

11. The power tool of claim 6, wherein the first and second ring gears are fixed relative to the housing; and wherein the shift actuator is further defined as an axially translatable portion of the common input member, the shift actuator including the first sun gear and the second sun gear wherein, in the first position, the shift actuator engages the common output member for locking the common input member relative to the common output member in the locked modes of the first and second planetary gear sets so that the first output torque is transmitted to the spindle, in the second position, the first sun gear engages the first plurality of planet gears so that the first output torque is received by the first planetary gear set in the reduction mode, and the second planetary gear set is in the disengaged mode so that the second output torque is transmitted to the common output member, in the third position, the first planetary gear set is in the disengaged mode and the second sun gear engages the second plurality of planet gears so that the first output torque is received by the second planetary gear set in the reduction mode and a third output torque is transmitted to the spindle.

12. A portable electric rotary power tool having a multiple speed transmission, the power tool comprising:

a housing;

an electric motor oriented within the housing, the motor having a rotary output shaft for providing a first output torque;

a plurality of gear reduction elements, each having an input member to receive an input torque and an output member to provide an output torque, wherein at least one of the input members is operably connected to the rotary output shaft to receive the first output torque, and wherein at least two of the gear reduction elements have a common input member and a common output member, and the at least two gear reduction elements each have an active mode and an inactive mode;

a shift actuator in selective communication with the at least two gear reduction elements; and an output spindle operably driven by one of the output members;

wherein the shift actuator has a first position wherein the at least two gear reduction elements are both in the inactive mode and locked with respect to the common input member for providing the second torque output to the spindle, the shift actuator has a second position wherein the first of the at least two gear reduction elements is in the active mode and the second of the at least two gear reduction elements is in the inactive mode, disengaged between the second input member and the second output member to provide the third output torque to the spindle, and the shift actuator has a third position wherein the first of the at least two gear reduction elements is in the inactive mode, disengaged between the first input member and the first output member and the second of the at least two gear reduction elements is in the active mode to provide the fourth output torque to the spindle.

13. A portable electric rotary power tool having a multiple speed transmission, the power tool comprising:

a housing;

an electric motor oriented within the housing, the motor having a rotary output shaft for providing a first output torque;

a plurality of planetary gear sets, each set including a sun gear for receiving an input torque, a plurality of planet gears oriented about and engaged with the sun gear, a planet carrier to provide an output torque, to which each of the planet gears is fixed for rotation and a ring gear oriented about and engaged with the plurality of planet gears, wherein at least one of the sun gears is operably connected to the rotary output shaft to receive the first output torque, and wherein at least two of the planetary gear sets have a common planet carrier and the sun gear of the second of the at least two planetary gear set is fixed to the sun gear of the first of the at least two planetary gear sets, and the at least two planetary gear sets each have a locked mode, a reduction mode and a disengaged mode;

a shift actuator in selective communication with the at least two planetary gear sets; and an output spindle operably driven by one of the planet carriers;

wherein the shift actuator has a first position wherein the at least two planetary gear sets are each in the locked mode, for providing the first output torque to the spindle, the shift actuator has a second position wherein the first of the at least two planetary gear sets is in the reduction mode and the second of the at least two planetary gear sets is in the disengaged mode for providing a second output torque to the spindle, the shift actuator has a third position wherein the first of the at least two planetary gear sets is in the disengaged mode and the second of the at least two planetary gear sets is in the reduction mode for providing a third output torque to the spindle.

14. The power tool of claim 13, wherein the power tool is further defined as a battery operated, direct current, electric drill.

15. The power tool of claim 13, wherein the shift actuator is further defined as an axially translatable sleeve wherein, in the first position, the shift actuator engages the planet carrier and ring gear of the first planetary gear set for locking the first and second planetary gear sets relative to the common input member in the locked modes so that the first output torque is transmitted to the spindle, in the second position, the shift actuator engages the ring gear of the first planetary gear set and the housing for securing the ring gear of the first planetary gear set relative to the housing so that the first output torque is received by the first planetary gear set in the reduction mode and the second planetary gear set is in the disengaged mode so that the second output torque is transmitted to the common output member, in the third position, the shift actuator engages the ring gear of the second planetary gear set and the housing for securing the ring gear of the second planetary gear set relative to the housing in the reduction mode and the first planetary gear set is in the disengaged mode so that the first output torque is received by the second planetary gear set and the third output torque is transmitted to the spindle.

16. The power tool of claim 13, wherein the first and second ring gears are fixed relative to the housing; and wherein the shift actuator is further defined as an axially translatable portion of the common output member, the shift actuator including the planet carrier of the first and second planetary gear sets, and the first and second pluralities of planet gears wherein, in the first position, the shift actuator engages the common input member for locking the common output member relative to the common input member in the locked modes of the first and second planetary gear sets so that the first output torque is transmitted to the spindle, in the second position, the first plurality of planet gears engage the first sun gear and the first ring gear so that the first output torque is received by the first planetary gear set in the reduction mode, and the second planetary gear set is in the disengaged mode so that the second output torque is transmitted to the common output member, in the third position, the first planetary gear set is in the disengaged mode and the second plurality of planet gears engage the second sun gear and the second ring gear so that the first output torque is received by the second planetary gear set in the reduction mode and a third output torque is transmitted to the spindle.

17. The power tool of claim 13, wherein the first and second ring gears are fixed relative to the housing; and
wherein the shift actuator is further defined as an axially translatable portion of the common input member, the shift actuator including the first sun gear and the second sun gear wherein, in the first position, the shift actuator engages the common output member for locking the common input member relative to the common output member in the locked modes of the first and second planetary gear sets so that the first output torque is transmitted to the spindle, in the second position, the first sun gear engages the first plurality of planet gears so that the first output torque is received by the first planetary gear set in the reduction mode, and the second planetary gear set is in the disengaged mode so that the second output torque is transmitted to the common output member, in the third position, the first planetary gear set is in the disengaged mode and the second sun gear engages the second plurality of planet gears so that the first output torque is received by the second planetary gear set in the reduction mode and a third output torque is transmitted to the spindle.

18. A portable electric rotary power tool having a multiple speed transmission, the power tool comprising:
a housing;
an electric motor oriented within the housing, the motor having a rotary output shaft for providing a first output torque;
a first gear reduction element operably driven by the rotary output shaft to receive the first output torque and to provide a second output torque, the first gear reduction element having an active mode and an inactive mode;
a second gear reduction element operably driven by the rotary output shaft to receive the first output torque and to provide a third output torque, the second gear reduction element having an active mode and an inactive mode;
a third gear reduction element selectively driven by the rotary output shaft, the first gear reduction element or the second gear reduction element to receive, respectively, the first, second or third output torque, and to provide, respectively, a fourth output torque, a fifth output torque and a sixth output torque;
an output spindle operably driven by the third gear reduction element; and a shift actuator having a first position for maintaining the first and second gear reduction elements in respective inactive modes for imparting the fourth output torque to the spindle, a second position for maintaining the first gear reduction element in the active mode and the second gear reduction element in the inactive mode for imparting the fifth output torque to the spindle, and a third position for maintaining the first gear reduction element in the inactive mode and the second gear reduction element in the active mode for imparting the sixth output torque to the spindle.

19. A portable electric rotary power tool having a multiple speed transmission, the power tool comprising:
a housing;
an electric motor oriented within the housing, the motor having a rotary output shaft for providing a first output torque;
a first gear reduction element operably driven by the rotary output shaft to receive the first output torque and to provide a second output torque;
a second gear reduction element operably driven by the first gear reduction element to receive the second output torque and to provide a third output torque, the second gear reduction element having an active mode and an inactive mode;
a third gear reduction element operably driven by the first gear reduction element to receive the second output torque and to provide a fourth output torque, the third gear reduction element having an active mode and an inactive mode;
an output spindle operably driven by the second gear reduction element or the third gear reduction element; and
a shift actuator having a first position for maintaining the second and third gear reduction elements in respective inactive modes for imparting the second output torque to the spindle, a second position for maintaining the second gear reduction element in the active mode and the third gear reduction element in the inactive mode for imparting the third output torque to the spindle, and a third position for maintaining the second gear reduction element in the inactive mode and the third gear reduction element in the active mode for imparting the fourth output torque to the spindle.

20. A portable electric rotary power tool having a multiple speed transmission, the power tool comprising:
a housing;
an electric motor oriented within the housing, the motor having a rotary output shaft for providing a first output speed;
at least four planetary gear sets connected in series and providing four distinct stages of reduction, each set including a sun gear, a plurality of planet gears oriented about and engaged with the sun gear, a planet carrier, to which each of the planet gears is fixed for rotation, and a ring gear oriented about and engaged with the plurality of planet gears, the first planetary gear set being operably driven by the motor;
a spindle operably driven by the fourth planetary gear set;
wherein at least two of the planetary gear sets are each shiftable between a locked mode, a reduction mode and a disengaged mode, for providing a reduced second output speed to the spindle during a two stage gear reduction, for providing a reduced third output speed to the spindle during a three stage gear reduction, and for providing a reduced fourth output speed to the spindle during another three stage gear reduction.

21. A portable electric rotary power tool having a multiple speed transmission, the power tool comprising:

a housing;

an electric motor oriented within the housing, the motor having a rotary output shaft for providing a first output torque;

a first sun gear coupled for rotation with the rotary output shaft;

a first planetary gear set for receiving the first output torque and transmitting a second output torque, the first planetary gear set including the first sun gear, a plurality of first planet gears oriented about and engaged with the first sun gear, a first planet carrier, to which the first planet gears are each fixed for rotation, and a first ring gear oriented about and engaged with the first planet gears, the first ring gear being fixed relative to the housing;

a second planetary gear set including a second sun gear fixed to the first planet carrier, a plurality of second planet gears oriented about and engaged with the second sun gear, a second planet carrier, to which the second planet gears are each fixed for rotation, and a second ring gear oriented about and engaged with the second planet gears;

a third planetary gear set including a third sun gear fixed to the first planet carrier, a plurality of third planet gears fixed for rotation to the second planet carrier and oriented about and engaged with the third sun gear, and a third ring gear oriented about and engaged with the third planet gears;

a fourth planetary gear set including a fourth sun gear fixed to the second planet carrier, a plurality of fourth planet gears oriented about and engaged with the fourth sun gear, a third planet carrier, to which the fourth planet gears are each fixed for rotation, and a fourth ring gear oriented and engaged with the fourth planet gears, the fourth ring gear being secured to the housing;

a spindle operably connected to and driven by the third planet carrier; and a shift actuator axially translatable relative to the housing and having a first position wherein the shift actuator engages the first planet carrier and the second ring gear so that the second output torque is transmitted to the second planet carrier, the shift actuator having a second position wherein the shift actuator engages the second ring gear and the housing for securing the second ring gear relative to the housing so that the second output torque is received by the second planetary gear set and a third output torque is transmitted to the second planet carrier, the shift actuator having a third position wherein the shift actuator engages the third ring gear and the housing for securing the third ring gear relative to the housing so that the second output torque is received by the third planetary gear set and a fourth output torque is transmitted to the second planet carrier;

wherein the fourth planetary gear set receives the second, third and fourth torque outputs from the second planet carrier and imparts, respectively, a fifth, sixth and seventh torque output to the spindle.

22. A portable electric rotary power tol having a multiple speed transmission, the power tool comprising:

a housing;

an electric motor oriented within the housing, the motor having a rotary output shaft for providing a first output torque;

a plurality of planetary gear sets, each having a sun gear to receive an input torque, a plurality of planet gears oriented about and engaged with the sun gear, a planet carrier, to which each of the planet gears is fixed for rotation and a ring gear fixed relative to the housing and oriented about and engaged with the plurality of planet gears; and an output spindle operably driven by one of the planet carriers;

wherein at least one of the sun gears is operably connected to the rotary output shaft to receive the first output torque;

wherein at least two of the planetary gears sets have a common planet carrier and the sun gear of the second of the at least two planetary gear sets is directly coupled to the sun gear of the first of the at least two planetary gear sets; and wherein either the coupled sun gears or the common planet carrier is axially translatable within the housing having a first position wherein the coupled sun gears are engaged with the common planet carrier for providing the first output torque to the spindle, a second position wherein the first sun gear is engaged with the first plurality of planet gears and the second sun gear is disengaged with the second plurality of planet gears so that the first output torque is received by the first planetary gear set and a second output torque is provided to the spindle, and a third position wherein the first sun gear is disengaged with the first plurality of planet gears and the second sun gear is engaged with the second plurality of planet gears so that the first output torque is received by the second planetary gear set and a third output torque is provided to the spindle.

* * * * *